(12) United States Patent
Zhao

(10) Patent No.: US 6,944,677 B1
(45) Date of Patent: Sep. 13, 2005

(54) COMMON USER PROFILE SERVER AND METHOD

(75) Inventor: Yan Zhao, Mountain View, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/567,255

(22) Filed: May 9, 2000

(51) Int. Cl.[7] ............................................. G06F 15/173
(52) U.S. Cl. ........................................ 709/244; 707/10
(58) Field of Search ................................ 709/203, 206, 709/244; 707/10

(56) References Cited

U.S. PATENT DOCUMENTS

| | | | | |
|---|---|---|---|---|
| 5,742,769 | A * | 4/1998 | Lee et al. ..................... | 709/206 |
| 5,790,785 | A * | 8/1998 | Klug et al. .................. | 713/202 |
| 5,813,006 | A * | 9/1998 | Polnerow et al. ............. | 707/10 |
| 5,920,820 | A * | 7/1999 | Qureshi et al. .............. | 455/461 |
| 6,195,660 | B1 * | 2/2001 | Polnerow et al. ............. | 707/10 |
| 6,230,188 | B1 * | 5/2001 | Marcus ........................ | 709/206 |
| 6,324,538 | B1 * | 11/2001 | Wesinger et al. ............. | 707/10 |
| 6,496,855 | B1 * | 12/2002 | Hunt et al. .................. | 709/217 |

OTHER PUBLICATIONS

Art Technology Group, "ATG Dynamo Personalization Server", Date Unknown, http://www.atg.com/products/dps/dps_main.html.
Qpass, "The Qpass PowerWallet Simplifies Online Shopping", Date Unknown http://www.qpass.com/CP_PowerWallet.asp.
Qpass, "Qpass Makes It Easy!", Date Unknown http://www.qpass/CO_HowItWorks.asp.
Qpass, "Get The Qpass PowerWallet Here", Date Unknown http://www.qpass.com/TransactionProcessing.asp.
Qpass, "The Transaction Processing Solution", Date Unknown http://www.qpass.com/TransactionProcessing.asp.
Microsoft Passport, "What is Passport?", Date Unknown http://memberservices.passport.com/HELP/MSRV_HELP_whatis.ASP.
Microsoft Passport, "What is the wallet service?", Date Unknown http://memberservices.passport.com/HELP/MSRV_HELP_whatiswallet.ASP.
Microsoft Passport, "What's stored in your wallet?", Date Unknown http://memberservices.passport.com/HELP/MSRV_HELP_walletprofile.asp.

* cited by examiner

*Primary Examiner*—Krisna Lim
(74) *Attorney, Agent, or Firm*—Schwegman, Lundberg, Woessner & Kluth, P.A.

(57) ABSTRACT

A method and apparatus is provided for facilitating the exchange of user profile information between an information provider and an application system. The invention allows a user to create and edit user profile information stored by an information provider. The information provider stores the information and provides a mechanism for providing the user profile information, or portions thereof, to various application systems. When a user initiates a registration or similar process with an application system, the present invention facilitates the exchange of information between the application system and the information provider to streamline the registration process.

18 Claims, 4 Drawing Sheets

COMMON USER PROFILE SERVER AND METHOD

FIELD OF THE INVENTION

This invention relates to the exchange of information between computer systems. In particular, this invention is drawn to common user profile server and method for using the same.

BACKGROUND OF THE INVENTION

An Internet user often registers with multiple web sites in order to sign up for subscriptions or services, make purchases, receive content, etc. During a typical registration process, the user must provide various information to the web site such as name, address, user id, email address, phone numbers, and other information. In a typical registration process, users fill out long forms by entering profile information into a web-based form. For example, when a user registers with a web site, the user must manually enter all of the required profile information. An Internet user must also go through a similar process when purchasing goods or entering contests. As a result, a typical Internet user enters the same user profile information over and over on multiple web sites.

In one type of prior art web-based application system, systems use a user profile data repository to store user information and support user personalized services. However, these user profile data repositories are per-system based, so that the user profile information is only used for that system or that service provider. Therefore, users must still provide user profile information to other web sites.

SUMMARY OF THE INVENTION

A method of the invention is provided for providing user profile data to a remote system including the steps of providing a data repository for storing information, storing user profile data in the data repository for one or more users, and upon receiving a request, providing user profile information corresponding to a user to the remote system.

Another embodiment of the invention provides a method of registering a user with a web site during a web site registration process including the steps of providing a data repository for storing user profile information for the user, and during the web site registration process, sending user profile information to the web site.

Another embodiment of the invention provides a user profile server for providing user profile information to a remote system including a data repository for storing user profile information relating to a plurality of users, and a service engine for sending user profile information to the remote system in response to a request from the remote system.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The present invention relates to a system and method for facilitating the exchange of information between computer systems. In particular, one embodiment of the invention involves the exchange of user profile information between an information provider and an application system. Generally, a user can create and edit user profile information stored by the information provider. This user profile information can be maintained by the user in one place. This user profile information may include any desired information such as name, contact information, preferences, user credentials, financial information, etc. The user profile information may also include information instructing the information provider who is authorized to receive user profile information. The user profile information also includes authentication and security information so that the profile information can only be used in a way desired by the user. The information provider stores the information and provides a mechanism for providing the user profile information, or portions thereof, to various application systems. When a user initiates a registration process with an application system, the present invention facilitates the exchange of information between the application system and the information provider to streamline the registration process.

For the purposes of this description, the term "information provider" is intended to mean a provider of user profile information. For example, an information provider may be referred to as a data repository, a server, a common user profile server, a service engine, a profile provider, etc. The term "application system" is intended to mean the thing or entity that receives user profile information. For example, an application system may be referred to as an application system client, a web site, a receiving site, a registor, a remote system, etc.

Figure 1:
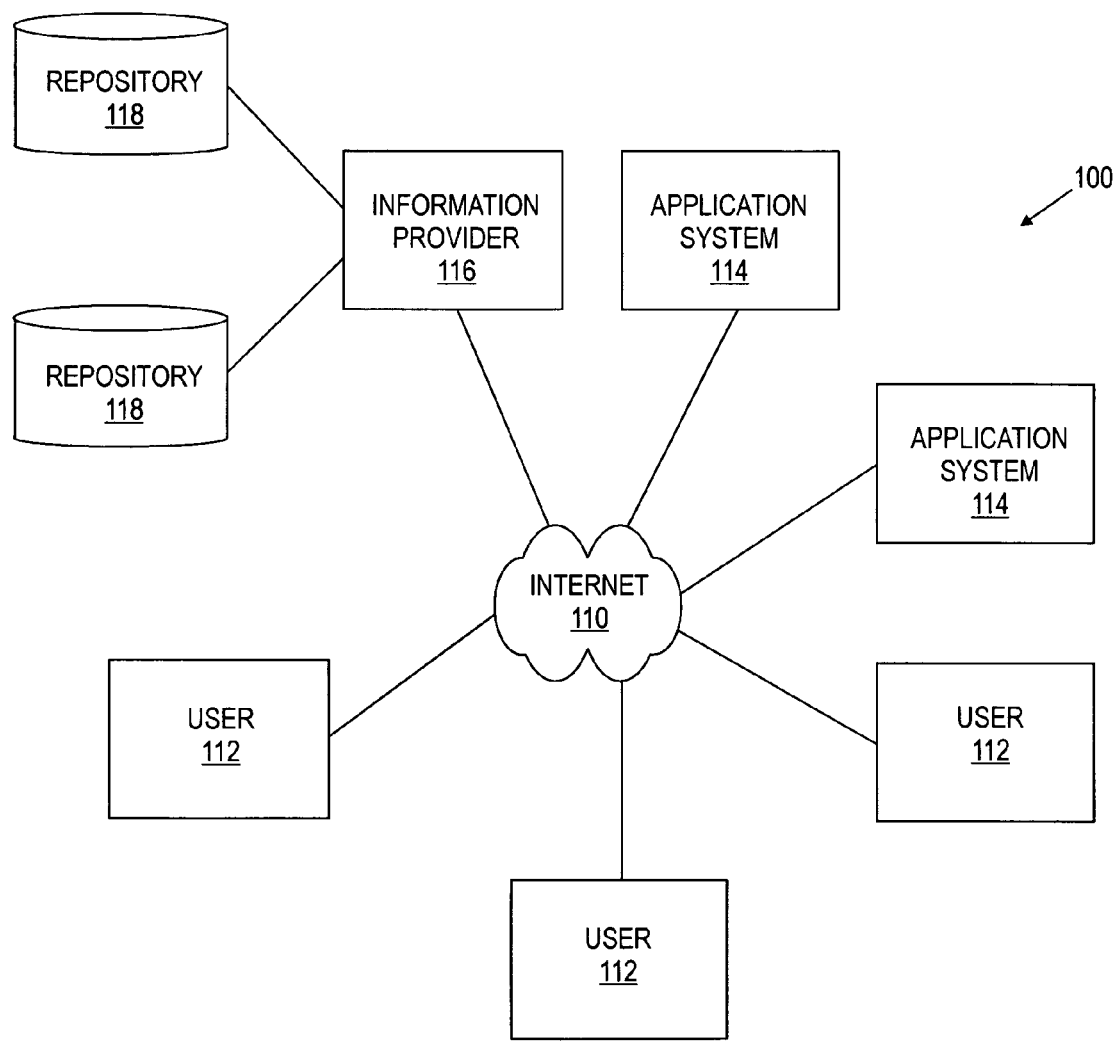
FIG. 1 is a block diagram of one embodiment of the present invention in an Internet environment.

The present invention may be implemented in any suitable type of environment, including an Internet or intranet environment. FIG. 1 is a block diagram illustrating one embodiment of the present invention in an Internet environment. FIG. 1 shows an Internet environment 100 including Internet 110 and a plurality of users 112. The users 112 are connected to the Internet 110 by any suitable type of connection such as dial up, DSL, ISDN, wireless, etc. A plurality of application systems 114 are also shown connected to the Internet 110. An information provider 116, including one or more repositories 118, is also connected to the Internet 110. Note that the invention may include multiple information providers. For the purposes of this description, only one information provider is shown.

In the Internet environment 100 shown in FIG. 1, information exchanged between the various components can be exchanged over the Internet 110. Note that information may be exchanged in other manners in place of, or in addition to, that shown. As mentioned above, each user 112 can create and edit user profile data which is stored in one or more of the repositories 118 via the information provider 116. A user 112 may establish an Internet connection, logon to the information provider 116, and create or edit profile information. When a user 112 desires to initiate a registration process with any of the application systems 114, the user 112 establishes an Internet connection and accesses the web site of the desired application system 114 via a web browser. During the registration process (or in place of a conventional registration process) the user 112 can provide the application system 114 with the information necessary for the application system 114 to obtain the profile information of the user 112. In one embodiment, the information provider 116 may require the application systems 114 to register with the information provider 116 before sending any profile information to the application systems 114. Once the application system 114 receives the appropriate information from a user 112, the application system 114 can send a request to the information provider 116. In response to the request, the information provider 116 sends the appropriate user profile data to the application system 114.

Figure 2:
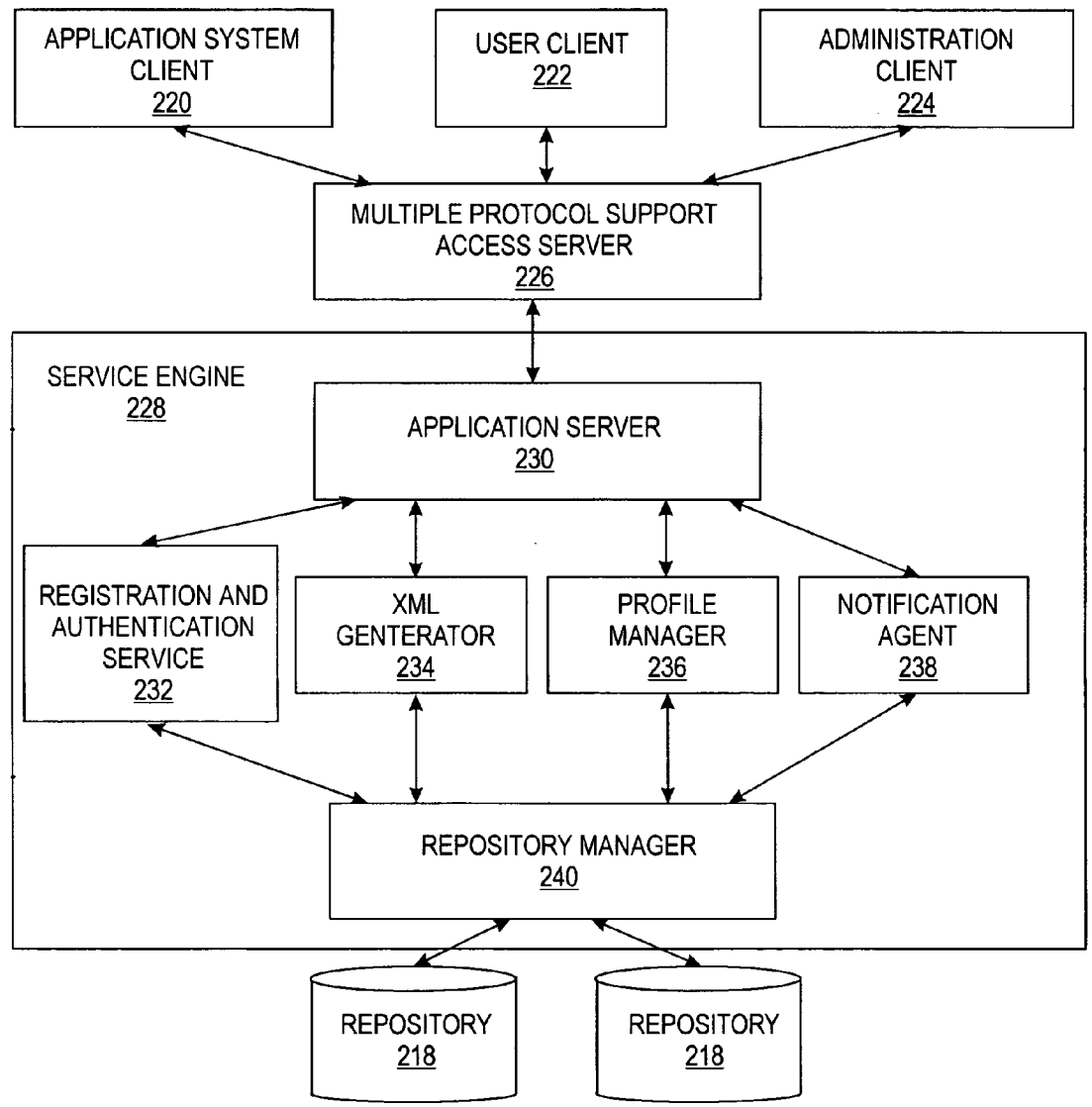
FIG. 2 is a block diagram illustrating one embodiment of the system architecture of the present invention.

FIG. 2 is a block diagram illustrating one embodiment of the system architecture of the system shown in FIG. 1. The system shown in FIG. 2 may be divided into three tiers including an access server tier, a service engine tier, and a repository tier.

The access server tier shown includes three clients. The first client shown is an application system client 220. The application system client 220 (e.g., the application systems 114 shown in FIG. 1) is allowed to access user data stored in by the information provider. Information exchanged between the information provider and the application systems may be eXtensible Markup Language (XML) based information. XML allows designers to create their own customized tags, enabling the definition, transmission, validation, and interpretation of data between applications. The second client shown in FIG. 2 is a user client 222. The user client 222 (e.g., the users 112 shown in FIG. 1) provides and manages the user profile information stored by the information provider. The third client shown is an administrative client 224. The purpose of the administration client 224 is to administer and manage the information provider system.

The clients 220, 222, and 224 can access the information provider using multiple protocols. Therefore, each client can use whichever protocol is best suited for that client. Examples of suitable protocols may include HTTP, FTP, IIOP, TCP/IP, and others. The multiple protocol support access server 226 provides an interface between the service engine tier (described below) and the clients. Since the clients may each use different protocols, the multiple protocol support access server 226 provides a common interface between each of the clients and the service engine 228.

The service engine tier is comprised of a service engine 228. The service engine 228 is the core component of the user profile server of the present invention. The service engine 228 links the repositories 218 to the clients. The service engine 228 includes an application server 230 which acts as a gateway or a trigger point for access to various services, including the services described below. The first service shown in FIG. 2 is the registration and authentication service 232. The registration and authentication service 232 facilitates both user registration and application system registration. For user registration, a user is allowed to enter and/or update a user profile stored by the information provider. For application system registration, the application system provides an application system profile. The application system profile may include a service name as well as the types of services provided by the application service. Therefore, when a user is determining whether to expose profile data to any specific application system, the user can make an informed decision based on the application system profile. The XML generator 234 is used to access data in the repositories 218 through the repository manager 240 (described below). The profile manager 236 manages the user profiles and application system profiles. The profile manager 236 also applies access control to the information stored in the repositories 218. In other words, the profile manager 236 controls which application systems can access which user profiles or groups of user profiles, or which application groups can access which user data or user group data. The notification agent 238 is used for sending updated events to the application systems in response to user profile changes. In addition, the notification agent 238 can notify a user when an application system requires more information than is stored in the repository 218. Another service that can be provided by the notification agent 238 relates to user profile updates. An application system can subscribe to a "user information update" event so that when a user updates profile information (such as providing a new address, etc.), the application system will be notified of the updated information. This allows a user to update the user's profile information in one place and have the information changed in all relevant application systems.

The repository manager 240 provides a link between the services described above and the repositories 218. The third tier is comprised of the repositories 218. Each repository 218 may be comprised of any suitable type of repository. For example, a repository 218 can be comprised of a relational database, a file system, or any other suitable system. The repository manager 240 allows any type of repository 218 to interface with the services described above. The repository manager 240 provides an encapsulation layer on top of the repositories 218. Therefore, the repositories 218 are transparent to the upper-level service components. As result, the repositories can be changed without significantly changing the rest of the system. In addition, a repository can be routed to a different place. In one embodiment, the information stored in the repositories 218 is generally object data which can be converted into XML format by the XML generator 234. In one embodiment, when a user requests data, the application server 230 will retrieve the data in XML format for the clients.

For security, Secure Sockets Layer (SSL) protocol may be used for XML file transmissions. Note that SSL may be used with other protocols as well. In addition, other security protocols or systems may also be used.

Figure 3:
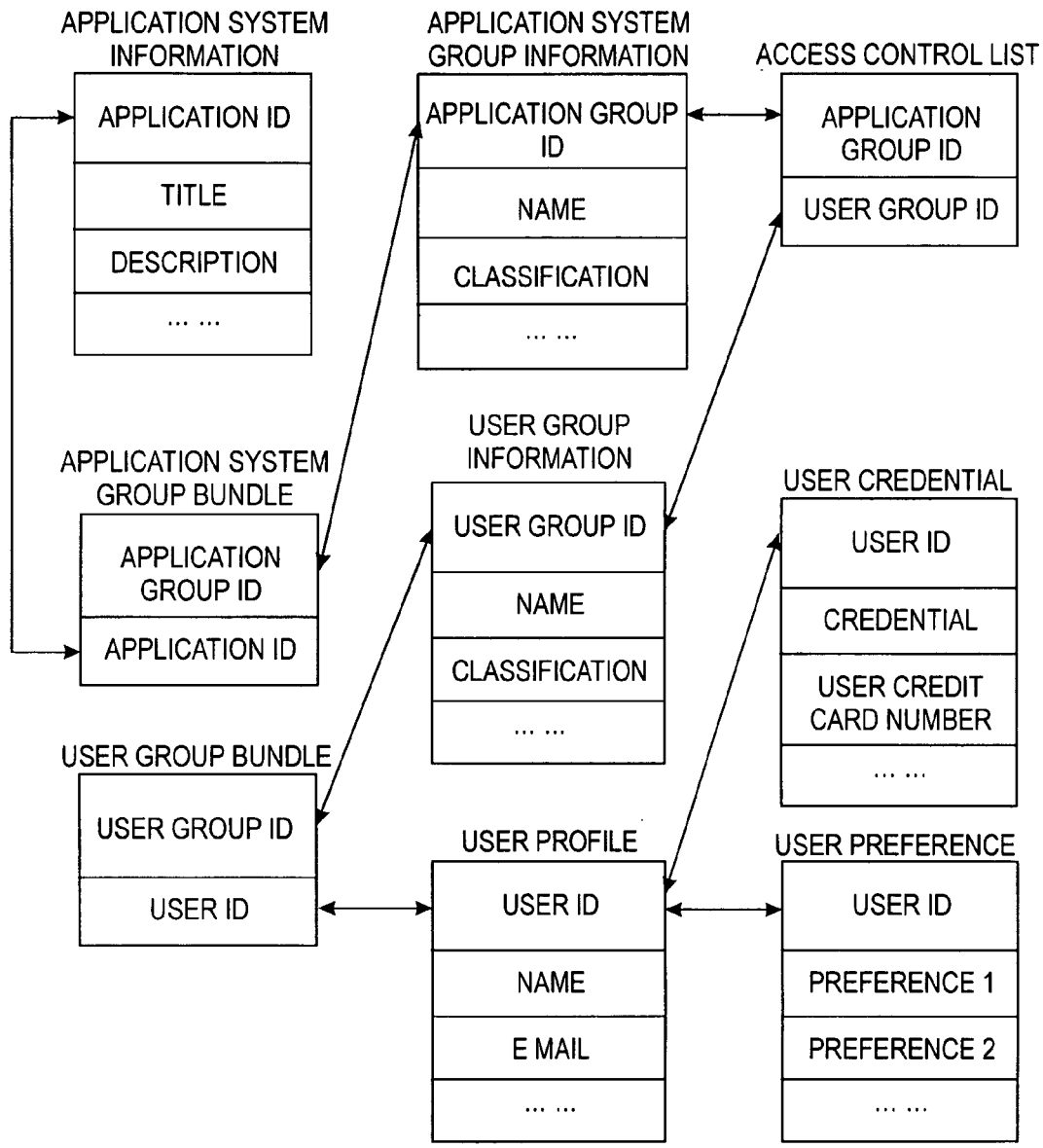
FIG. 3 is a block diagram illustrating one embodiment of a database schema which may be used with the present invention.

FIG. 3 is a diagram illustrating one embodiment of a database schema which may be used for the common user profile server of the present invention, where a relational database is used for the repository implementation. The data schema used for user profile data includes tables of user profile information, user credentials, user preferences, and user groups. Since the user profile information is separate from the user credential information, better security may be applied more easily to one over the other. For example, if the user credential information includes credit card numbers, a higher level of encryption may be desired for that data. The separated user preference table gives flexibility for user preference data presentation. As mentioned above, in one embodiment, users are organized into groups for more efficient access control. In one embodiment, a user can only be in one group to facilitate easier access control set up without causing any access eligibility conflicts. In these embodiments, an application system may be allowed access to users within certain user groups. The user groups may then be set up such that a user who wants an application system (or a certain type of application system) to have access to user profile data will be placed in a certain user group.

As shown, the database schema also includes application system information, application system group information, and access control list (ACL) tables to support common user profile services and to apply access control on application systems. In one embodiment, an application system may be included in different groups at the same time, which enables more flexible and granular access control relating to different user groups. A user group may allow access from a multiple application groups. In addition, an application group may access multiple user groups. This is implemented by the cross referencing capability of the access control list. It can be seen that the database schema shown in FIG. 3 allows many options and lots of flexibility.

The access control methodology for the user profile service of the present invention may be set up by an administrator. However, a user is allowed to view and update the content as well as access or control the user's personal data. Access control may be applied in several ways. For example, as mentioned above, application systems in certain application system groups may be allowed access to information in certain user groups and not other groups. In another example, user profile information may be available to application systems on a case-by-cases basis. Ultimately, access control will depend primarily on the desires and needs of the users.

Figure 4:
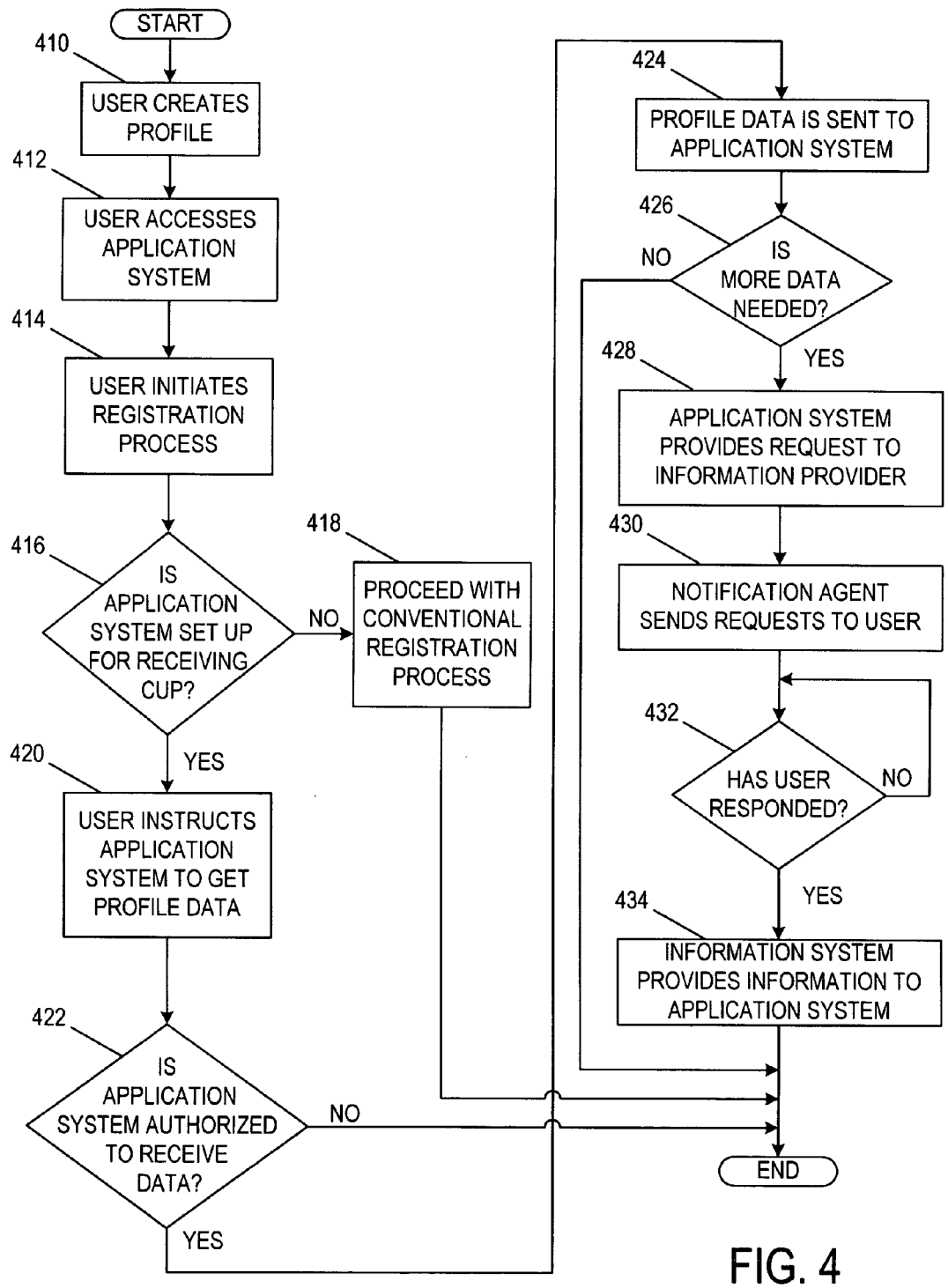
FIG. 4 is a flow chart illustrating one example of a registration process implementing the present invention.

As mentioned above, the common user profile server of the present invention may be used during the registration process between a user client and an application system client. FIG. 4 is a flowchart illustrating an example of a registration process utilizing one embodiment of the present invention in an Internet environment. In the example described, it is assumed that the user wishes to register with an application system for the purposes of subscribing to an online magazine, purchasing a product, or for some other purpose where the application system requires user profile information.

At step 410 in FIG. 4, the user creates a user profile. This may be accomplished by logging into the information provider and entering and/or editing profile information as described above. This step may not be necessary if the user has already created a user profile. At step 412, the user accesses the application system client. In one embodiment, this is accomplished by simply going to the application system's web site. At step 414, the user initiates the registration process. This step may be accomplished in many ways. For example, the application server web site may include a link or button which initiates the process. The process may also be initiated automatically in some manner. At step 416, the process asks whether the application system is set up for receiving common user profile (CUP) information. As mentioned above, in one embodiment, the application system must already be registered with the information provider. In another embodiment, the application system is not required to be registered with the information provider, but has to be able to receive the profile information in an available format and protocol. If the application system is not set up for receiving profile information, the process proceeds to step 418 and the registration process is completed in a conventional manner. If the application system is set up for receiving profile information, the process proceeds to step 420 where the user instructs the application system to retrieve the profile data from the information provider. This step may be accomplished by the user clicking on a link or button, or may be initiated automatically in response to the initiation of the registration process. This step may also be accomplished by the user indicating where to find the user profile information (e.g., a URL, the identification of an information provider, etc.). In one embodiment, the application system may require the user to enter a username and/or password or provide a digital certificate to authenticate that the user has the authority to allow the release of the user's profile information.

At step 422, the process asks whether the application system is authorized to receive profile data. If not, the process ends. If so, the process continues to step 424. At step 424, the user profile data is sent by the information provider to the application system. Note that the data sent only includes data in which the application system is authorized to receive. At step 426, the process asks whether more information is needed by the application system to complete the registration process. In other words, whether the application system requires more user data than is provided by the information provider. If no additional information is required, the process ends. If more information is needed, the process proceeds to step 428 where the application system provides a request for more information to the information provider. In response to this request, the notification agent will send a request for additional information, in the form of an email, to the user (step 430). At step 432, the process waits for a response from the user. Once the user has responded to the information provider by adding information to the user's profile, the process proceeds to step 434 where the additional information is provided to the application system by the notification agent. In one embodiment, steps 428 through 434 may be bypassed by the application system asking the user directly for more information. For example, if the Internet session between the user and the application system is still going on, the application system may simply prompt the user for more information.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of providing user profile data to a remote system, the method including:
   storing the user profile data in a data repository for at least one user;
   upon receiving a request, providing user profile information corresponding to a user to the remote system; and
   notifying the user when the remote system requires more user profile information than previously provided.

2. The method of claim 1, wherein the request comes from the remote system.

3. The method of claim 1, wherein the request comes from the user.

4. The method of claim 1, further including allowing the at least one user to edit the user profile data stored in the data repository.

5. The method of claim 1, wherein the request includes authentication information.

6. The method of claim 5, wherein the user profile information is only provided to the remote system if the request includes valid authentication information for the user.

7. The method of claim 1, wherein the remote system is connected to the Internet.

8. The method of claim 7, wherein the remote system is a web server.

9. A method to register a user with a web site during a web site registration process, the method including:

storing user profile information, associated with the user, in a data repository;

communicating the user profile information to the web site during the web site registration process; and notifying the user when the web site requires more user profile information than previously communicated.

10. The method of claim 9, further including providing a user profile server to provide a link between the data repository and the web site.

11. The method of claim 10, further including:

using an Internet browser to access the web site;

initiating the registration process; and providing information to the web site relating to the user profile server.

12. The method of claim 11, wherein the information includes authentication information.

13. The method of claim 11, wherein the information is provided by selecting an option on the web site.

14. The method of claim 9, wherein the user controls the content of the user profile information communicated to the web site.

15. The method of claim 14, further including updating the user profile information before communicating the user profile information to the web site.

16. A user profile server to provide user profile information to a remote system, the user profile server including:

a data repository to store user profile information relating to a plurality of users;

a service engine to communicate the user profile information to the remote system responsive to a request from the remote system; and a notification agent to notify users when the remote system requires additional information.

17. The user profile server of claim 16, wherein the request includes authentication information.

18. The user profile server of claim 17, wherein the remote system obtains the authentication information from a user.

* * * * *